(12) United States Patent
Chen

(10) Patent No.: US 7,806,379 B1
(45) Date of Patent: Oct. 5, 2010

(54) HOLDER FOR LIQUID CONTAINER

(75) Inventor: Ming-Chang Chen, Yung Kang (TW)

(73) Assignee: Co-Union Industry Co., Ltd., Yung Kang (TW)

( * ) Notice: Subject to any disclaimer, the term of this patent is extended or adjusted under 35 U.S.C. 154(b) by 0 days.

(21) Appl. No.: 12/501,918

(22) Filed: Jul. 13, 2009

(51) Int. Cl.
*A47K 1/08* (2006.01)
(52) U.S. Cl. .................................................. 248/311.2
(58) Field of Classification Search ............... 248/213.2, 248/213.4, 229.15, 127, 907, 121, 210, 229.17, 248/230.8
See application file for complete search history.

(56) References Cited

U.S. PATENT DOCUMENTS 1,858,565 A * 5/1932 Sokolow et al. ............. 493/406
5,988,575 A * 11/1999 Lesko ....................... 248/213.2
2007/0045496 A1* 3/2007 Kane ........................... 248/313

* cited by examiner

*Primary Examiner*—J. Allen Shriver, II
*Assistant Examiner*—Erin Smith
(74) *Attorney, Agent, or Firm*—Occhiuti Rohlicek & Tsao LLP

(57) ABSTRACT

A holder for a liquid container includes a frame body and a resilient holding ring. The frame body includes a container-holder having a substantially C-shaped surrounding wall that defines a container-receiving space and that has inner and outer surfaces, and two spaced-apart free ends. The resilient holding ring is molded over the frame body, and includes an inner lining layer covering the inner surface of the surrounding wall and extending from one of the free ends to the other one of the free ends, and a bridge portion bridging the free ends of the surrounding wall, being stretchable between the free ends, and directly connected to the inner lining layer. The bridge portion and the inner lining layer form a ring.

4 Claims, 5 Drawing Sheets

HOLDER FOR LIQUID CONTAINER

BACKGROUND OF THE INVENTION

1. Field of the Invention

This invention relates to a holder, more particularly to a holder which can be mounted to, for example, a rod of a car or similar object for holding a liquid container.

2. Description of the Related Art

Referring to FIGS. 1 and 2, a conventional holder 1 may be mounted to a circular rod 10 of an object for holding a liquid container 11, and includes a one-piece plastic frame body 12, and a fastening unit 13 to fasten tightly the frame body 12 onto the rod 10. The frame body 12 includes a clamp portion 121, a container-holder 123, and a connecting portion 122 interconnecting the clamp portion 121 and the container-holder 123. The container-holder 123 has a substantially C-shaped surrounding wall 125 opposite to the clamp portion 121 and defining a receiving space 124. The surrounding wall 125 has two free ends 126. A gap 127 is formed between the free ends 126.

To use the conventional holder 1, the clamp portion 121 is first fastened to the rod 10 through the fastening unit 13, after which the liquid container 11 is inserted into the receiving space 124 so as to be held by the surrounding wall 125. Although the conventional holder 1 can achieve its intended purpose, since the liquid container 11 is held by the surrounding wall 125 which is integrally formed from plastic, and since the frame body 12 must bear the weight of the entire liquid container 125, the surrounding wall 125 thus formed is harder and has a small deformability, so that the liquid container 11 must have a size that fits into the receiving space 124. Hence, use of the conventional holder 1 is limited. Further, since an inner surface of the surrounding wall 125 is smooth and cannot provide a good surface resistance with an outer surface of the liquid container 11, the holding effect of the conventional holder 1 is not ideal, so that the liquid container 11 is unstable, and is likely to rock within the receiving space 124.

SUMMARY OF THE INVENTION

Therefore, the object of the present invention is to provide a holder that can hold different sizes of liquid containers in a stable manner.

According to this invention, a holder for a liquid container comprises a frame body and a resilient holding ring. The frame body includes a container-holder having a substantially C-shaped surrounding wall that defines a container-receiving space and that has inner and outer surfaces, and two spaced-apart free ends. The resilient holding ring is molded over the frame body, and includes an inner lining layer covering the inner surface of the surrounding wall and extending from one of the free ends to the other one of the free ends, and a bridge portion bridging the free ends of the surrounding wall, being stretchable between the free ends, and directly connected to the inner lining layer. The bridge portion and the inner lining layer form a ring.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
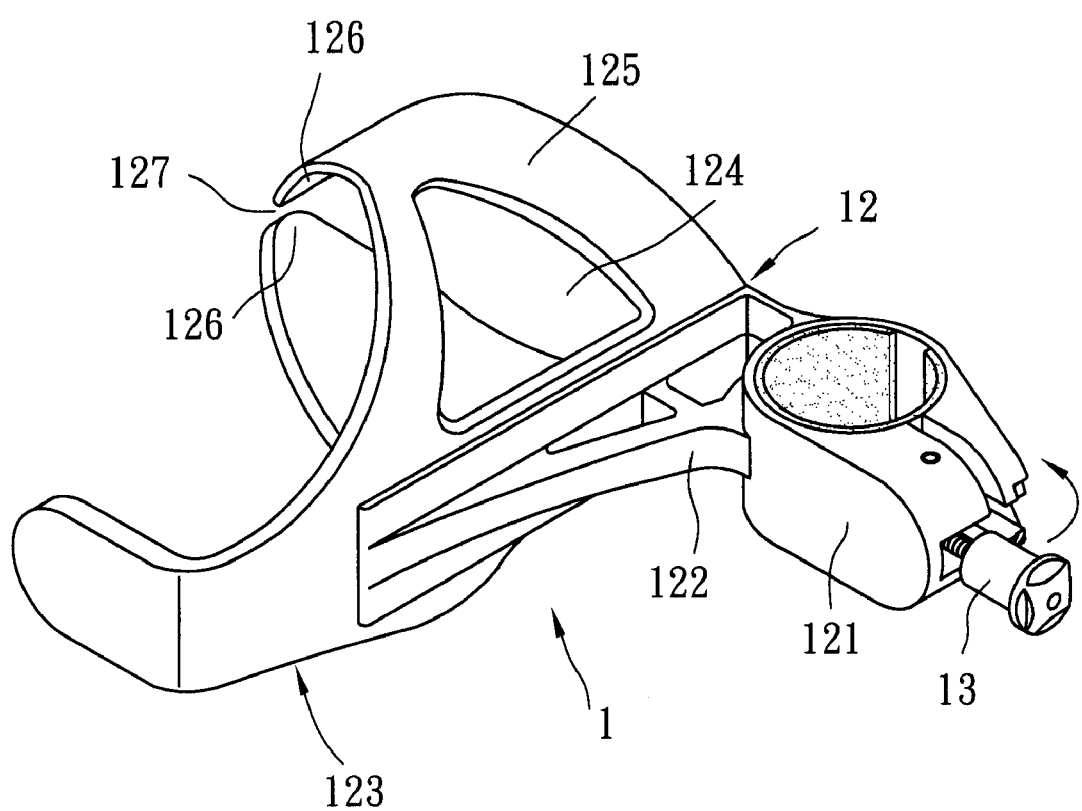
FIG. 1 is a perspective view of a conventional holder.
Figure 2:
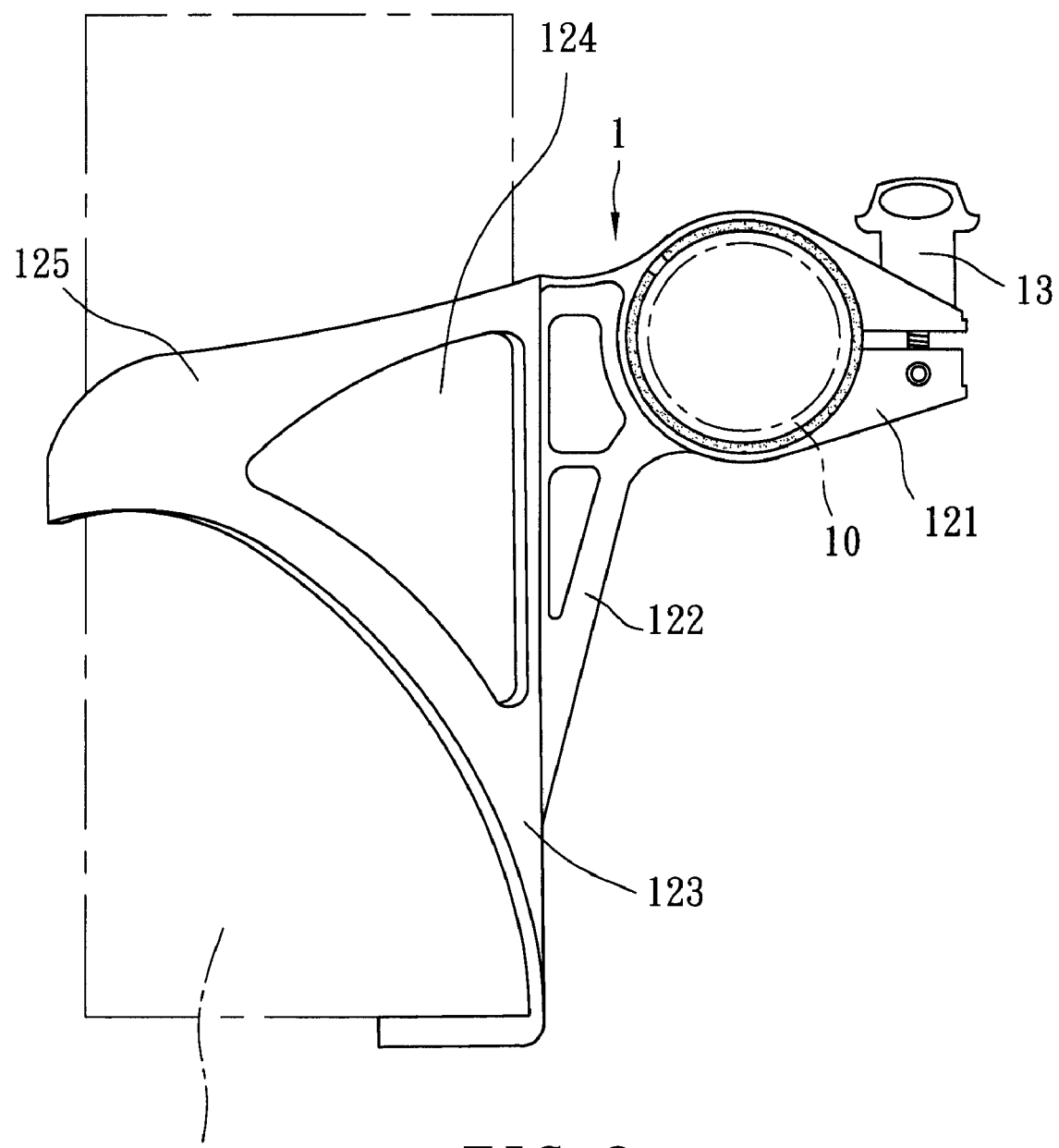
FIG. 2 is a schematic view of the conventional holder in a state of use.
Figure 3:
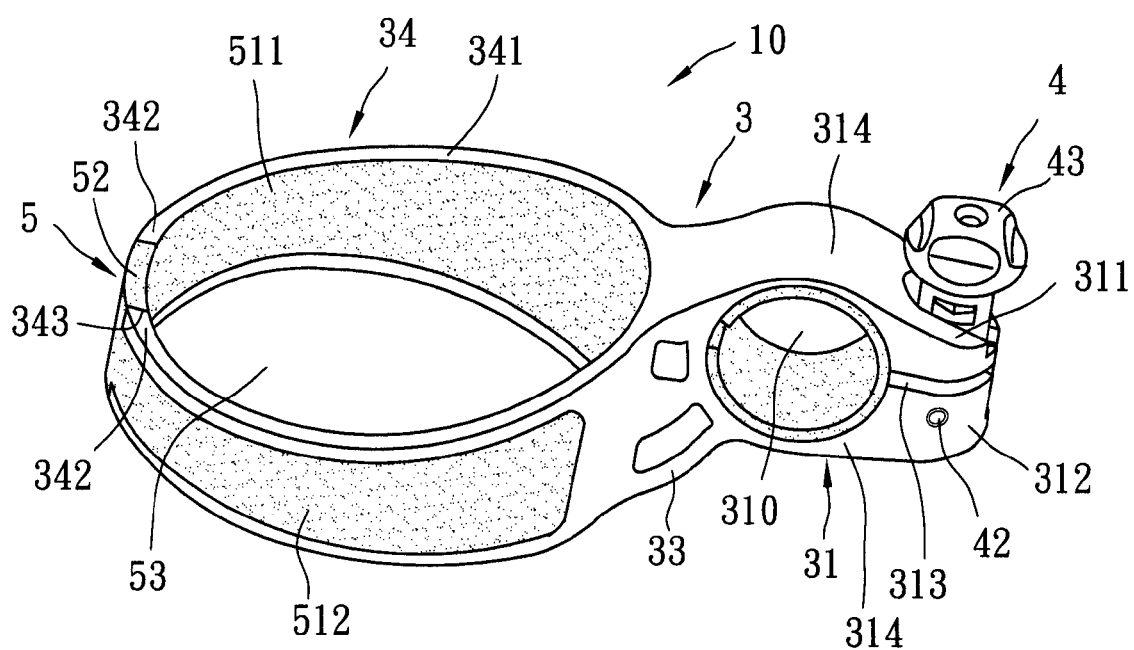
FIG. 3 is a perspective view of a holder according to the preferred embodiment of the present invention.
Figure 4:
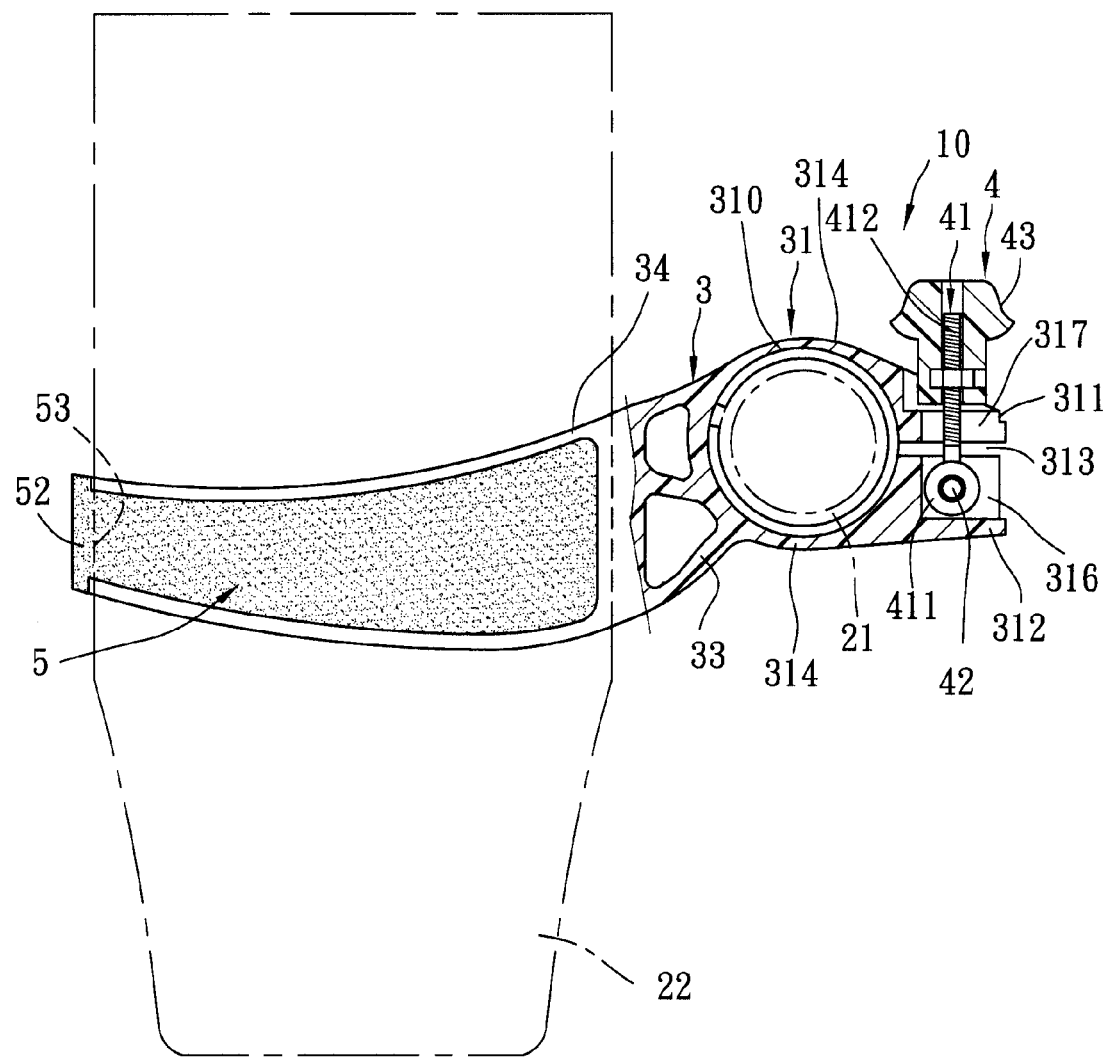
FIG. 4 is a partly sectional side view of the preferred embodiment in a state of use.
Figure 5:
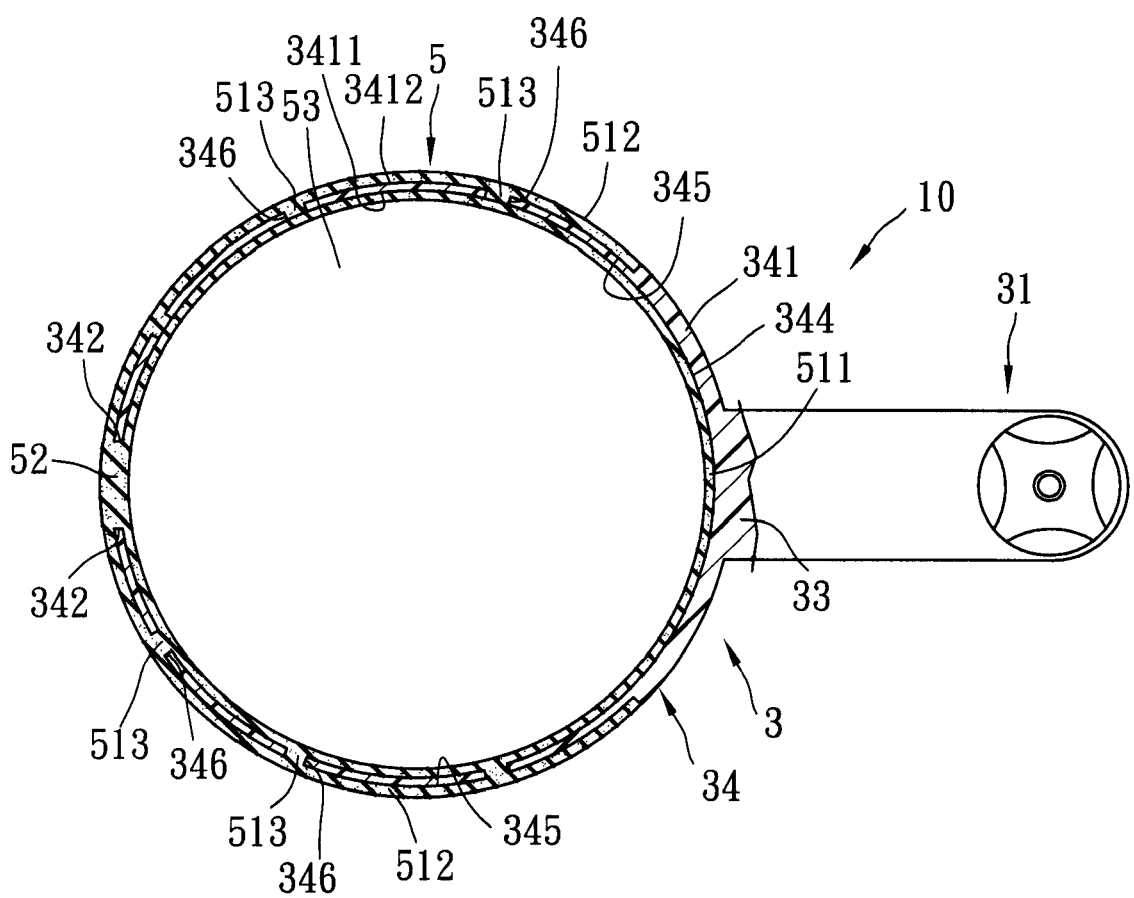
FIG. 5 is a partly sectional top view of the preferred embodiment.

Referring to FIGS. 3 to 5, a holder 10 according to the preferred embodiment of the present invention is adapted to be mounted to a circular rod 21 (see FIG. 4) of an object for holding a liquid container 22 (see FIG. 4), and is shown to comprise a frame body 3 and a resilient holding ring 5.

The frame body 3 is a one-piece plastic frame body, and includes a clamp portion 31, a container-holder 34, and a connecting portion 33 interconnecting the clamp portion 31 and the container-holder 34. The clamp portion 31 has two spaced-apart jaws 314 cooperatively defining a clamping space 310 and respectively having jaw-ends 311, 312. A gap 313 is formed between the jaw-ends 311, 312, and communicates spatially with the clamping space 310. The jaw-end 312 has an inwardly extending lower groove 316 (see FIG. 4). The jaw-end 311 has an inwardly extending upper groove 317 communicating spatially with the lower groove 316.

A fastening unit 4 fastens together the jaws 314, and includes a threaded rod 41, a pivot pin 42, and a tightening nut 43. The threaded rod 41 has a pivot portion 411 disposed pivotally in the lower groove 316, and a threaded shank portion 412 extending from the pivot portion 411 and out of the lower and upper grooves 316, 317. The pivot pin 42 is inserted into the pivot portion 411 so as to mount the pivot portion 411 pivotally within the lower groove 316. The tightening nut 43 is mounted threadedly to the threaded shank portion 412. When the tightening nut 43 is tightened, the jaw-end 311 is pushed toward the jaw-end 312 so as to reduce the gap 313 therebetween. Because the gap 313 is reduced, the size of the clamping space 310 is also reduced. Simultaneously, the jaws 314 of the clamp portion 31 clamp tightly an outer periphery of the rod 21 therebetween.

The container-holder 34 has a substantially C-shaped surrounding wall 341 that defines a container-receiving space 53 and that has inner and outer surfaces 3411, 3412, a plurality of angularly spaced-apart through holes 346 extending from the inner surface 3411 to the outer surface 3412, and two spaced-apart free ends 342 opposite to the clamp portion 31. A gap 343 is formed between the free ends 342. The surrounding wall 341 further has an inner groove 344 formed in the inner surface 3411 and extending from one of the free ends 342 to the other one of the free ends 342, and two outer grooves 345 formed in the outer surface 3412 and each extending between the connecting portion 33 to a corresponding one of the free ends 342.

The resilient holding ring 5 is made of a soft resilient material, such as rubber, silicone, and the like, and is molded over the container-holder 34. The holding ring 5 includes an inner lining layer 511, two outer lining layers 512, a bridge portion 52, and a plurality of ribs 513. The inner lining layer 511 covers the inner surface 3411 of the surrounding wall 341, is received in the inner groove 344, and extends from one of the free ends 342 to the other one of the free ends 342. The outer lining layers 512 cover the outer surface 3412 of the surrounding wall 341, and are received respectively in the outer grooves 345. Each outer lining layer 512 extends between the connecting portion 33 and a corresponding one of the free ends 342. The bridge portion 52 fills the gap 343, bridges the free ends 342, and is stretchable between the free ends 342. Further, the bridge portion 52 is directly connected between free ends of the inner lining layer 511, and is directly connected between ends of the outer lining layers 512 that are distal from the connecting portion 33. The bridge portion 52 and the inner lining portion 511 form a ring. The ribs 513 extend respectively into the through holes 346 so as to interconnect the inner and outer lining layers 511, 512.

To use the holder 10 of the present invention, the jaws 314 of the clamp portion 31 are first clamped between the rod 21, after which the tightening nut 43 is tightened, thereby positioning tightly the frame body 3 onto the rod 21. Alternatively, the fastening unit may be formed using other configurations that may be similarly used to position the frame body 3 onto the rod 21. The liquid container 22 can then be inserted fittingly into the container-receiving space 53.

It is worth mentioning that the holder 10 of the present invention makes use of the surrounding wall 341 to support the weight of the liquid container 22, and makes use of the holding ring 5 that is molded over the container-holder 34 to hold and embrace the liquid container 22. Since the holding ring 5 is made from a soft resilient material, such as rubber, silicone, and the like, the inner lining layer 511 thereof can provide a tight embracing force. Also, the bridge portion 52 thereof, which fills the gap 343, is resiliently deformable, such that the container-receiving space 53 is expandable, thereby facilitating insertion of different sizes of the liquid containers 22 into the container-receiving space 53. The liquid container 22 can thus be stably embraced by the inner lining layer 511 and the bridge portion 52 of the holding ring 5. Therefore, the structure of the holder 10 of the present invention is not only novel, it can also facilitate holding of different sizes of the liquid containers 22, as well as enhance stable positioning of the liquid container 22.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A holder for a liquid container, comprising:
   a frame body including a container-holder having a substantially C-shaped surrounding wall that defines a container-receiving space and that has inner and outer surfaces, and two spaced-apart free ends; and
   a resilient holding ring molded over said frame body and including an inner lining layer covering said inner surface of said surrounding wall and extending from one of said free ends to the other one of said free ends, and a bridge portion bridging said free ends of said surrounding wall, being stretchable between said free ends, and directly connected to said inner lining layer, said bridge portion and said inner lining layer forming a ring.

2. The holder of claim 1, wherein said frame body further includes a clamp portion connected to said surrounding wall opposite to said free ends and having two spaced-apart jaws, and a fastening unit for fastening together said jaws.

3. The holder of claim 2, wherein said surrounding wall further has a plurality of angularly spaced-apart through holes extending from said inner surface to said outer surface, said resilient holding ring further including two outer lining layers covering said outer surface of said surrounding wall and each extending between said clamp portion and a corresponding one of said free ends, and a plurality of spaced-apart ribs extending respectively into said through holes to interconnect said inner and outer lining layers.

4. The holder of claim 3, wherein said surrounding wall further has an inner groove that is provided on said inner surface, that extends from one of said free ends to the other one of said free ends, and that receives said inner lining layer, and two outer grooves provided on said outer surface and each extending between said clamp portion and a corresponding one of said free ends and receiving respectively said outer lining layers.

* * * * *